United States Patent [19]

DeAngelis

[11] Patent Number: 4,605,633

[45] Date of Patent: * Aug. 12, 1986

[54] REACTION SINTERED MULTIPHASE CERAMIC

[75] Inventor: Thomas P. DeAngelis, Horseheads, N.Y.

[73] Assignee: Corning Glass Works, Corning, N.Y.

[ * ] Notice: The portion of the term of this patent subsequent to Aug. 13, 2002 has been disclaimed.

[21] Appl. No.: 454,673

[22] Filed: Dec. 30, 1982

[51] Int. Cl.$^4$ .................... C04B 35/56; C04B 35/58
[52] U.S. Cl. ............................. 501/87; 501/96; 501/97; 501/98
[58] Field of Search ............ 501/97, 98, 96, 48, 501/66, 153, 87; 423/411, 412; 252/520; 204/291, 292

[56] References Cited

U.S. PATENT DOCUMENTS

| | | | |
|---|---|---|---|
| 2,618,565 | 11/1952 | Nicholson | 106/44 |
| 3,011,983 | 12/1961 | Ricker | 252/520 |
| 3,084,060 | 4/1963 | Baer et al. | 117/5.1 |
| 3,305,374 | 2/1974 | Murata | 106/57 |
| 3,353,954 | 11/1967 | Williams | 75/201 |
| 3,692,474 | 9/1972 | Arber et al. | 423/344 |
| 3,705,112 | 12/1972 | Nienart | 252/520 |
| 3,928,244 | 12/1975 | Passmore | 252/520 |
| 4,145,224 | 3/1979 | Mehalchick et al. | 106/73.3 |
| 4,534,835 | 8/1985 | DeAngelis | 501/96 |

*Primary Examiner*—Mark L. Bell
*Attorney, Agent, or Firm*—R. N. Wardell

[57] ABSTRACT

Ceramic body formed by reaction sintering at pressures ranging from subatmospheric to superatmospheric of admixed and shaped reactants, which can be elements, compounds, intermetallic compounds and/or alloys, in stoichiometric proportions to substantially form 5-95 mole percent of nitride phase or phases of one or both of Al and Si, and 5-95 mole percent of second phase or phases being boride, carbide, silicide and/or sulfide of one or more of elements of Groups 3b including lanthanide and actinide series elements, 4b, 5b and 6b, which phases have a maximum grain size substantially not greater than 10 μm and which body contains 0 to 4 weight percent oxygen.

21 Claims, No Drawings

REACTION SINTERED MULTIPHASE CERAMIC

BACKGROUND OF THE INVENTION

The field of the invention is ceramic bodies which have one or more of nitride phases of Al and/or Si plus one or more of phases of boride, carbide, silicide and/or sulfide of Groups 3b, 4b, 5b and 6b elements. A combination of the latter compounds can be either two discrete phases (e.g. a boride and a carbide) or a single complex phase (e.g. a borocarbide).

Most commonly heretofore, these ceramic bodies have been of the type physically formed of ingredients corresponding to the crystalline phases in the ceramic bodies. By way of exemplary illustration, reference is made to the following prior art documents. U.S. Pat. No. 3,108,887 discloses hot pressed particulate mixtures of AlN with other compounds, among which are mentioned the compounds MX where M is different from X and is selected from aluminum, boron, silicon, rare earth metals, titanium, zirconium, hafnium, thorium, vanadium, columbium (niobium), tantalum, protactinium, chromium, molybdenum, tungsten and uranium (although no example is given of any of these MX compounds). U.K. Patent Specification No. 954,272 discloses bodies, either sintered or hot pressed, of particulate mixtures of AlN with a boride of titanium, zirconium, chromium or molybdenum. U.S. Pat. Nos. 3,251,700 and 3,328,280 disclose hot pressed or sintered particulate mixtures of $TiB_2$ and AlN.

Generally those hot pressed or sintered physical mixtures require heating to relatively high temperatures of 1800°–2000° C. or so. Moreover, such ceramic bodies have properties which are dependent upon and limited by the inherent effects of the physical nature of their ingredients which are physically combined. The distribution and sizing of the phases are generally directly related to the particle sizing and mixing of ingredient powders. The powders are not always easily available in uniformly fine sizes for obtaining homogeneous distribution of phases and superior properties. Milling of powders to improve their sizing can lead to undesirable situations. In fact, some powders such as $TiB_2$ in sizes of about 5 $\mu$m or finer present fire and explosion hazard during milling due to their rapid reaction with oxygen in air under conditions of frictional heating.

Amongst numerous reactions for forming other types of multiphase bodies by an unusual reaction hot pressing process involving passage of electric current through the reaction mixture during the process, U.S. Pat. No. 3,143,413 discloses reaction hot pressed ceramics with phases of ZrN and either ThS, VaC or ZrC, but no details are given about the properties of such bodies made from −60 mesh reactant powders heated up to 1800°–2300° C.

There has been a continuing need for multiphase ceramics with easily controlled and predictable composition, crystal structure (including uniform phase distribution and fine grain size) and related physical properties, and which can be easily and economically fabricated in a variety of shapes by heating at lower temperatures.

SUMMARY OF THE INVENTION

It is an object of this invention is to provide a product or body which substantially overcomes the aforesaid limitations of the prior art and enables the practical attainment of greater technical and economic ease and flexibility in providing ceramic bodies of Al and/or Si nitride and certain boride, carbide, silicide and/or sulfide phases with specially tailored and improved properties as noted herein.

It is also an object of this invention to provide certain advantageous product features as detailed hereinafter.

The invention is characterized by the discovery of a novel reaction sintered ceramic body and the method of forming it, which body is characterized by uniformly fine-grained and intimately interdispersed phases of certain nitride and other nonoxide compound easily obtained from reactants generally having substantially larger particle sizing than the grain size of the phases in the ceramic body, viz. usually one order of magnitude larger. The reaction hot pressed body of this invention is noted for virtual absence of open porosity, toughness and hardness for wear resistance, corrosion/erosion resistance to molten aluminum and cryolite (with the other nonoxide phase of Groups 4b to 6b metals), low electrical resistivity, thermal shock and oxidation resistance. It is also notable that these valuable properties can be attained by heating and mixture of reactants to temperature not greater than 1650° C. and without need for any grain growth inhibitor or sintering aid.

The invention is a reaction sintered multiphase ceramic body consisting essentially of a fine-grained, homogeneous, intimate interdispersion of:

(a) 5–95 (preferably 45–95) mole percent of nitride phase or phases having a maximum grain size substantially (e.g. at least 95 volume percent) not greater than 10 $\mu$m and being nitride of one or both of Al and Si, and (b) 5–95 (preferably 5–55) mole percent of second phase or phases having a maximum grain size substantially (e.g. at least 95 volume percent) not greater than 10 $\mu$m and being boride, carbide, silicide, sulfide or combination thereof of one or more of the elements of Groups 3b including lanthanide and actinide series elements, 4b, 5b and 6b;

which body contains 0 to 4 weight percent oxygen and is prepared by the process comprising:

(c) admixing particulate reactants of maximum particle size substantially (e.g. at least 95 volume percent) not greater than 150 $\mu$m and being elements, compounds, intermetallic compounds, alloys or combination thereof in stoichiometric proportions to substantially form the nitride and second phases, and (d) shaping and heating the admixture to form the reaction sintered body, the heating being done in nonreactive atmosphere and at temperature at which the reaction and sintering occurs between the reactants to substantially form the nitride and second phases.

Reaction sintering involves the dual effects of reaction between and sintering together of the admixed reactants at temperature causing the reaction to occur and be substantially completed. It may be effected at atmospheric, subatmospheric or superatmospheric pressure. The latter condition involves the substantially simultaneous shaping and heating steps of hot pressing to produce a body of the invention with very little or no open porosity and highest strength properties, although some preliminary separate pressing or heating of the reactant admixture may be advantageously done. Where open porosity is desired in an otherwise tough and hard body of the invention, the separate heating step at atmospheric or subatmospheric pressure may be employed sequentially following the shaping step.

Of course, reaction temperature is governed by the particular reactants and their identified reaction temperature at whatever pressure is selected for performing the heating step.

The body of the invention may contain, as part of the nitride and/or second phases, diluent which is a nonreacted portion of the reactant admixture as a stoichiometric excess amount of a reactant and/or as a nitride or second phase according to the aforesaid invention definition but different than the reactants.

DETAILED DESCRIPTION

It is believed that reaction sintering relies on the reaction having a substantial negative heat of formation as the driving force for the reaction. The products or bodies formed must have lower free energy of formation than the reactants from which they were prepared. The elements of the groups of the Periodic Table as recited in the description of the invention are selected for the invention body so as to conform to these principles.

Reaction sintering is initiated by heating the shaped mixture. At the reaction initiation temperature, the reactants begin to react and liberate a substantial amount of heat. This exotherm causes a sharp temperature rise in the reactant powder mixture. It is believed that this rapid temperature rise permits rapid diffusion of the reactants within the mixture, which causes either hot pressing compaction or sintering shrinkage under atmospheric or subatmospheric pressure as well as further chemical reaction to occur quickly. The reaction initiating temperature is generally much lower than the temperature necessary to attain a dense body by conventional hot pressing or separate pressing and sintering of performed phase ingredients where no reaction occurs.

Several processing parameters may be adjusted to optimize the conduction of the reaction sintering and the properties of the resultant ceramic body. Some of these parameters are: type, purity and surface area of the particulate reactants; stoichiometry of the reactant mixture; pretreatment of the reactants, rate of heating; magnitude of applied pressure before and/or during heating; post heating treatments; and geometry of the body or product.

Reaction sintering of admixtures according to this invention produces articles or bodies with the nitride and second phases having very small grain size, generally about one order of magnitude smaller than the particle size of the starting reactant powders. The reaction sintered ceramic bodies can be easily prepared with maximum grain sizes of the nitride and second phases being substantially (e.g. at least 95 volume percent) not greater than 5 $\mu$m (preferably not greater than 1 $\mu$m) or even with mean grain sizes of such phases being substantially (e.g. at least 95 volume percent) not greater than 6 $\mu$m (preferably 2 $\mu$m). These very fine grain sizes can be attained by using reactants with maximum particle sizes substantially (e.g. at least 95 volume percent) not greater than 44 $\mu$m or with mean particle sizes less than about 25 $\mu$m. Grain growth is usually not experienced because the products or bodies can be made at significantly lower temperatures with shorter hold times at heating temperature than by conventional nonreactive manufacturing techniques. Achieving such small grain sizes is often difficult if not impractical to accomplish using conventional nonreactive techniques because either preformed phase powders are not readily available in such small particle size of less than 5 $\mu$m for the reasons noted above or irregular grain growth occurs at the higher processing temperatures in the absence of effective grain growth inhibitor.

Generally the particulate reactants are mixed in the stoichiometric proportions to form the desired product phases. For example, the following molar proportion formula describes exemplary reaction mixture and product phases:

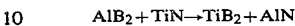

$$AlB_2 + TiN \rightarrow TiB_2 + AlN$$

However, nonstoichiometric proportions (e.g. of TiN) may be used in order to vary the properties of the product or to control the reaction process. Powdered diluent material may also be added to the reactant mixture. The diluent may be or contain one of the elements of the reactants or may be the same as one of the reaction-produced phases in the products or may be other suitable material, any of which may be used to control the reaction sintering or properties of the resultant product. The amount of diluent or diluents must be less than that amount which would prevent the reaction sintering from taking place.

The reactants can be mixed or blended in any suitable manner known to those skilled in ceramic technology for yielding an intimate, homogeneous mixture of reactant particles, e.g. by ball milling in dry or wet condition.

For very dense products, the hot pressing procedure, including hot isostatic pressing, is employed. The mixed reactants are charged into a mold. If desired, those reactants may be given pretreatments such as dehydration, degassing or burn-out of binder, provided the pretreatment temperature is kept below the reaction initiation temperature. It is advantageous to precompact the reactant mixture at room temperature and at 50–100% hot pressing pressure to ensure a uniformly compacted product after hot pressing. This was routinely done in making samples of the invention. For common hot pressing with a mold comprising an annular die with upper and lower plungers, the mold for precompaction (and even pretreatment) is preferably the same one used in subsequent hot pressing. The mold can be of any material not adversely reactive with the reaction mixture and that can withstand desired pressures up to 15,000 psi (about 1055 kg/cm$^2$) or more. Graphite molds have been found very suitable for pressures up to 10,000 psi (about 700 kg/cm$^2$) and were exclusively used in making the samples of the invention. At least the precompaction pressure is usually applied to the charged mold and a suitable atmosphere is provided to completely contact the charged mold before heating is begun to effect reaction hot pressing. A moderate vacuum (e.g. about 1×10$^{-4}$ Torr) was satisfactorily employed in making the samples of the invention; however, inert gas atmosphere may alloyed for the same purpose of protecting the reactants and the mold from adverse air oxidation. As necessary, the pressure is increased to the full load during heating to or at the maximum hot pressing temperature. To assure good body density, full pressure should be at lest 2000 psi (about 140 kg/cm$^2$). Heating can be done in any suitable hot pressing furnace, such as an induction heating furnace or electric resistance heating furnace used to make samples of the invention, which provides very rapid heat-up. Heating rates satisfactorily employed ranged between 9° and 25° C./minute, the slower rates being used with reactant mixtures evolving hydrogen that is drawn off by the vacuum system. Heating progresses to a temperature at which the reaction sintering is initiated. That event is marked by a rapid temperature rise in the mold due to exothermic heat evolution from the reaction. When the maximum temperature and pressure for the reaction hot pressing are attained, they are usually held for at least some short period to assure complete reaction sintering, e.g. about 1–2 hours for products ranging between 1.5–4 inches (about 3.8–7.6 cm) in diameter and about 0.2–0.5 inch (about 0.5–1.3 cm) thick as in the cases of the samples made of the invention. Thereafter, the molds containing the samples are cooled in the furnace under protective atmosphere at furnace cooling rate and the pressure is held on the samples until they were cooled to about room temperature. Then the molds are removed from the furnace and the samples are pressed out of the annular mold body.

For bodies of lesser density, the reactant mixture can be fully compacted or shaped at room temperature generally at pressures up to 60,000 psi (about 4.2 tons/cm$^2$) or more, but preferably between 10–50×10$^3$ psi (about 0.7–3.5 tons/cm$^2$), to yield a green (i.e. unfired) body, which is subsequently sintered at atmospheric pressure. Preforming of the green body can be done by an suitable ceramic fabrication process, e.g. dry or wet pressing, isostatic pressing, slip casting, extrusion, injection molding, doctor blading, etc.

The multiphase ceramic bodies of this invention can be specially designed to have selected useful properties from a variety of choices depending upon their composition and processing. Generally they are very refractory and thermal shock resistant. They are also generally electroconductive. Many have low electrical resistivity and can function as electrodes or electrical conductors in a variety of applications. With resistance to chemical attack, such electrode and conductor applications can be in industrial electrochemical processes including electrolytic metal production (electrowinning and electrorefining) cells, batteries and fuel cells. Some bodies can have adequate electrical resistance to function as electrical resistance elements such as heating elements. Most of them are wear-resistant and hard. They can also exhibit good strength and toughness. Consequently, those bodies can also useful serve as cutting tool tips, grinding media, high temperature bearings, engine components and other structural parts. In their more porous form, they may serve, for example, as filters for molten metal, as diaphragms or other components of electrolytic metal production cells, or as high surface area or catalytic devices.

The above-described reaction sintered ceramic body, preferably in hot pressed form, can be used for components of an electrolytic aluminum production (electrowinning and electrorefining) cell in contact with the liquid contents thereof when the second phase is or phases are boride, carbide, silicide and/or sulfide of one or more of the elements selected from Groups 4b, 5b and 6b. Especially desirable is the body of diboride of metal selected from Group 4b (particularly titanium) and aluminum nitride.

Bodies A & B

The following two bodies are an exemplary comparison of a reaction hot pressed ceramic body and a conventionally nonreaction hot pressed ceramic body. Both had batch mixtures formulated to give 1:1 molar ratio of TiB$_2$ and AlN phases in those bodies.

Body A of the invention was formed according to the molar formula previously stated. The reactant mixture consisted of 44 wt. % AlB$_2$ of 9.2 μm mps and 56 wt. % TiN of 7.4 μm mps. The AlB$_2$ powder contained 1.9 wt. % oxygen and 0.22 wt. % carbon. The TiN powder contained 0.76 wt. % oxygen and 0.19 wt. % carbon. These reactants were dry mixed without binder in a revolving plastic jar with alumina balls. That mixture was hot pressed in a graphite mold and in a vacuum at a maximum reaction sintering temperature of 1600° C. and 4000 psi (281.2 kg/cm$^2$) for 2 hours. This reaction is particularly interesting because TiN was thought to be thermodynamically more stable than TiB$_2$. However, TiN and AlB$_2$ do react to form TiB$_2$ and AlN and that reaction is complete at 1600° C.

Body B not of the invention was formed from a batch mixture consisting of 62.9 wt. % TiB$_2$ of 3.2 μm mps and 37.1 wt. % AlN of 8.8 μm mps. The TiB$_2$ powder contained 0.36 wt. % oxygen and 0.26 wt. % carbon. The AlN powder contained 2.22 wt. % oxygen and 0.17 wt. % Carbon. These nonreactive components were wet mixed with trichlorethane in a revolving plastic jar with alumina balls. The nonreactive mixture was hot pressed in the same manner as for Body A except that hot pressing was at 1650° C. and 5000 psi.

The comparative properties of Bodies A and B are set forth in Table 1. The lower resistivity values of Body A are believed related to a more uniform interdispersion distribution of small TiB$_2$ grains therein in comparison with the microstructure of Body B, the latter exhibiting larger and more nonuniform grain sizing.

Samples of Body A were tested for suitability for use as a component, e.g. cathode or cathode current collector, in an electrolytic aluminum production cell. In a cathode pool test, a sample of Body A was merely placed submerged (but not connected at the cathode) in the molten aluminum cathode pool of a laboratory test cell operated at about 1000° C. for 10 hours with anode and cathode current density of about 0.5 A/cm$^2$. In a hanging cathode test, a sample of Body A was suspended and connected as the cathode extending into the representative molten cryolite-aluminum batch of the laboratory test cell operated as noted above. The samples were wetted by aluminum in both tests. The cathode pool test showed only very slight surface erosion and one small surface crack, but otherwise the sample had original sharp edges and surface. No visible corrosion/erosion occurred in the hanging cathode test.

TABLE 1

|  | Body A | Body B |
| --- | --- | --- |
| x-ray phases (see Note 1) | TiB$_2$ (M) AlN(m) TiN(T) | TiB$_2$ (M) AlN(m) |
| O$_2$ wt. % | 1.44 | 1.64 |
| C, wt. % | 0.21 | 0.26 |
| Boride/nitride phases grain size, μm | about 1–2 | about 3.2–8.8 |
| Density, g/cc | 3.83 | 3.0 |
| % of theoretical density | 97.0 | 75.9 |
| Open porosity, % | 0.3 | 18.7 |
| Modulus of rupture @20° C., psi × 10$^3$ | 46.5 | 16.9 |
| Thermal shock 20° C. air → 1000° C. molten Al → 20° C. air. | No crack | N.D. (See Note 2) |
| Electrical resistivity, μΩ-cm in argon: |  |  |
| 25° C. | 47.0 | 148 |
| 250° C. | 75 | N.D. |
| 500° C. | 110 | N.D. |

TABLE 1-continued

|  | Body A | Body B |
| --- | --- | --- |
| 750° C. | 140 | N.D. |
| 1000° C. | 178 | N.D. |

Note 1:
(M) indicates major phase peaks, (m) indicates minor phase peaks and (T) indicates trace phase peaks.
Note 2:
N.D. indicates that property was not determined.

Bodies C & D

These bodies of the invention illustrate the effect on properties by different particle sizing of the reactant powders and demonstrate that generally superior properties are attained with finer particle sizing of those powders. Both of these bodies were made in accordance with the following molar formula:

$$TiN + Al + 2B \rightarrow TiB_2 + AlN$$

from a reaction mixture consisting of 56.02 wt. % TiN powder, 24.45 wt. % Al powder and 19.53 wt. % B powder. The particle sizes of these powders were:

| Powder | Body C | Body D |
| --- | --- | --- |
| TiN | −325 mesh | −200 + 325 mesh |
|  | 5.2 μm mps | 47 μm mps |
| Al | −325 mesh | −100 + 200 mesh |
|  | 22 μm mps | 80 μm mps |
| B | 5 μm mps | 94 μm mps |

After the usual dry mixing, the reactant mixtures were hot pressed at 1650° C. and 5000 psi (351.5 kg/cm$^2$) in vacuum. X-ray analysis of both bodies showed TiB$_2$(M) and AlN(m). The other comparative properties of these two bodies are shown in Table 2.

TABLE 2

|  | Body C | Body D |
| --- | --- | --- |
| TiB$_2$/AlN phases grain size, μm | ≦1 | 1-10 |
|  |  | (5.5 mean) |
| Al, wt. % | 23.1 | 21.4 |
| Ti, wt. % | 44.6 | 45.2 |
| N, wt. % | 12.3 | 12.3 |
| O, wt. % | 0.79 | 0.82 |
| C, wt. % | 0.25 | 0.15 |
| Density, g/cc | 3.91 | 3.48 |
| Open porosity, % | 0 | 1.6 |
| Modulus of Rupture @20° C., psi × 10$^3$ | 47.2 | N.D. |
| (tons/cm$^2$) | 3.32) |  |
| Young's Modulus @20° C., psi × 10$^6$ | 61.17 | 39.35 |
| (tons/cm$^2$ × 10$^3$ | 4.300 | 2.766) |
| Rockwell A hardness | 91 | 74 |
| Electrical Resistivity @25° C., μΩ-cm | 48.98 | 72.44 |

Body C exhibited relatively uniform grain size and homogeneous mixture of the phases while Body D showed a large grain size range and somewhat nonhomogeneous phase distribution.

Samples of Body C were formed into two cutting tips of cutting tools with the standard diamond shaped profile and tested in a customary metal cutting test. The test involved a standard procedure of cutting a 2 inch (5.08 cm) diameter bar or workpiece of Viscount 44 high-nickel alloy steel for each test cycle with the experimental cutting tips bonded to a cutting tool base so as to have 0° rake angle and 4° clearance angle from the workpiece. Dept of cut was 0.032 inch (0.81 mm). The workpiece was rotated at 450 rpm to provide a cutting rate of 220 surface feet/minute (5.59 m/min). The lateral feed rate axially along the workpiece was 0.005 inch/revolution (0.127 mm/revolution) and the lateral length of the workpiece cut was 2 inches (5.08 cm). Cutting was done with and without spraying of customary cutting oil lubricant onto the cutting tip at the point of contact with the workpiece. The chips of metal removed from the workpiece during this test were classified as follows, with the best cutting performance being Class 1 and the poorest cutting performance being Class 3:

Class 1—a single long continuous chip.
Class 2—two or more moderately long continuous chips.
Class 3—short segmented or discontinuous chips.

The results of testing the cutting tip samples of Body C in a first cycle of the above-described test were as follows:

|  | Sample 1 | Sample 2 |
| --- | --- | --- |
| Lubrication | No | Yes |
| Class of chips | 2 | 1 |
| Tip edge condition | Slight crater | No visible wear |
| Metal build up on tip edge | Slight | None |

Sample 1 satisfactorily performed cutting for 15 cycles before failure, at which time the edge of the tip broke and no longer cut the workpiece.

Body E

This body of the invention was made according to the molar formula:

$$TiAl + BN + B \rightarrow TiB_2 + AlN$$

by dry mixing a reactant mixture consisting of 67.76 wt. % TiAl powder of 33 μm mps, 22.46 wt. % BN powder of 10 μm mps and 9.78 wt. % B powder of 94 μm mps. This mixture was hot pressed in the usual manner at 1600° C. and 6000 psi (421.8 kg/cm$^2$). The resultant body had the phases TiB$_2$(M) and AlN(m), boride and nitride grain sizes of <1 μm, 23.3 wt. % Al, 41.1 wt. % Ti, a density of 3.93 g/cc, 0.1% open porosity, Young's Modulus of 57.6×10$^6$ psi (4.05×10$^3$ tons/cm$^2$), Rockwell A hardness 90 and electrical resistivity at 25° C. of 60.2 μΩ-cm.

Body F

This body of the invention involved the molar formula:

$$3TiSi_2 + 8BN + TiH_2 \rightarrow 4TiB_2 + 2Si_3N_4 + H_2$$
(reactants)          (product phases)        (gas).

The dry-mixed reactant mixture consisted of 55.7 wt. % of TiSi$_2$ powder of −325 mesh, 35.4 wt. % of BN powder of 10 μm mps and 8.9 wt. % TiH$_2$ powder of 2.4 μm mps. After hot pressing in the usual manner at 1600° C. and 6000 psi (421.8 kg/cm$_2$), the fabricated body had the phases: TiB$_2$(M), Si$_3$N$_4$(M), BN(T) and TiSi$_2$(T). Body F also had boride and nitride grain sizes of <5 μm, a density of 3.15 g/cc, 12.4% open porosity and Young's Modulus of 21.59×10$^6$ psi (1.518×10$^3$ tons/cm$^2$), Rockwell A hardness 77.5 and electrical resistivity at 25° C. of 1380 μΩ-cm.

Body G

This body of the invention was generally premised on the molar formula:

$$3TiN + Al_4C_3 \rightarrow 3TiC + 3AlN + Al$$

It was made from a dry-mixed reactant mixture consisting of 56.3 wt. % TiN of 7.1 μm mps and 43.7 wt. % Al₄C₃ of 13.5 μm mps. After hot pressing in the usual manner at 1600° C. and 6000 psi (421.8 kg/cm²), x-ray analysis of the body showed phases of TiC(M), AlN(m) and Al(T). The aluminum metal phase was negligible. The body analytically contained 28.8 wt. % Al and 45.9 wt. % Ti. Properties of the body were: <5 μm carbide and nitride grain sizes, 3.76 g/cc density, 3.5% open porosity, 37.31×10⁶ psi (2.623×10³ tons/cm²) Young's Modulus, Rockwell A hardness 84.5 and 295 μΩ-cm electrical resistivity at 25° C.

Other reaction sintered ceramic bodies (with or without hot pressing as desired) can be formed by appropriately selecting other reactant mixtures within the invention definition. The following molar formulas are illustrative of such other selections:

$$AlB_2 + LaN + 4B \rightarrow AlN + LaB_6$$

$$AlB_2 + TaN \rightarrow AlN + TaB_2$$

$$AlB_2 + MoN \rightarrow AlN + MoB_2$$

$$4Al + 2BN + CrN_2 \rightarrow 4AlN + CrB_2$$

$$Al + C + MoN \rightarrow AlN + MoC$$

$$3SiC + 4WN + C \rightarrow Si_3N_4 + 4WC$$

$$AlSi_2 + TiN \rightarrow AlN + TiSi_2$$

$$Al + 4Si + Ti_2N \rightarrow AlN + 2TiSi_2$$

$$Al + 2Si + MoN \rightarrow AlN + MoSi_2$$

$$4LaN + 11Si \rightarrow Si_3N_4 + 4LaSi_2$$

$$4NbN + 11Si \rightarrow Si_3N_4 + 4NbSi_2$$

$$Al_2S_3 + 2CeN + Ce \rightarrow 2AlN + 3CeS$$

$$Al_2S_3 + 3CeN \rightarrow 2AlN + 3CeS + 0.5N_2$$

$$Al_2S_3 + 3CeN + Al \rightarrow 3AlN + 3CeS$$

$$Al_2S_3 + 3TaN + Al \rightarrow 3AlN + 3TaS$$

$$2Al_2S_3 + 2CrN_2 + Cr \rightarrow b\ 4AlN + 3CrS_2$$

$$8S + 3Si + 4TiN \rightarrow Si_3N_4 + 4TiS_2$$

Preferably the reaction sintered multiphase ceramic should contain less than 1 wt. % of oxygen.

I claim:

1. A reaction sintered multiphase ceramic body consisting essentially of a fine-grained, homogeneous, intimate interdispersion of:
   (a) 5–95 mole percent of nitride phase or phases having a maximum grain size substantially not greater than 10 μm and being nitride of one or both of Al and Si, and
   (b) 5–95 mole percent of second phase or phases having a maximum grain size substantially not greater than 10 μm and being boride, carbide, silicide, sulfide or combination thereof of one or more of the elements of Groups 3b including lanthanide and actinide series elements, 4b, 5b and 6b;

which body contains 0 to 4 weight percent oxygen and is prepared by the process comprising:

(c) admixing particulate reactants of maximum particle size substantially not greater than 150 μm and being elements, compounds, intermetallic compounds, alloys or combination thereof in stoichiometric proportions to substantially form the nitride and second phases, and (d) shaping and heating the admixture to form the reaction sintered body, the heating being done in atmosphere that is nonreactive with the admixture and at temperature at which the reaction and sintering occurs between the reactants to substantially form the nitride and second phases.

2. The body of claim 1 which is prepared by the shaping and heating being separate sequential steps.

3. The body of claim 1 which is prepared by the shaping and heating being substantially simultaneous steps of hot pressing.

4. The body of claim 1 wherein the mean grain size of the nitride and second phases is not greater than 6 μm and the mean particle size of the reactants is less than 100 μm.

5. The body of claim 4 wherein the maximum grain size of the nitride and second phases is substantially not greater than 5 μm and the maximum particle size of the reactants is substantially not greater than 44 μm.

6. The body of claim 5 wherein the mean grain size of the nitride and second phases is substantially not greater than 2 μm.

7. The body of claim 6 wherein the maximum grain size of the nitride and second phases is not greater than about 1 μm.

8. The body of claim 1 having the second phase or phases being boride, carbide, silicide, sulfide or combination thereof of one or more of the elements of Groups 4b, 5b and 6b.

9. The body of claim 8 having the second phase or phases being diboride of one or more of the elements of Group 4b.

10. The body of claim 9 having the nitride phase being AlN.

11. The body of claim 1 having 45–95 mole percent of the nitride phase or phases and 5–55 mole percent of the second phase or phases.

12. The body of claim 11 which is prepared by the shaping and heating being substantially simultaneous steps of hot pressing.

13. The body of claim 12 wherein the mean grain size of the nitride and second phases is not greater than 6 μm and the mean particle size of the reactants is less than 100 μm.

14. The body of claim 13 having the second phase or phases being boride, carbide, silicide, sulfide or combination thereof of one or more of the elements of Groups 4b, 5b and 6b.

15. The body of claim 14 wherein the maximum grain size of the nitride and second phases is substantially not greater than 5 μm and the maximum particle size of the reactants is substantially not greater than 44 μm.

16. The body of claim 15 having the second phase or phases being diboride of one or more of the elements of Group 4b.

17. The body of claim 16 wherein the mean grain size of the nitride and second phases is substantially not greater than 2 μm.

18. The body of claim 17 having the nitride phase being AlN.

19. The body of claim 18 wherein the maximum grain size of the AlN and diboride phases is not greater than about 1 μm.

20. The body claim 19 having a second phase of TiB2.

21. The method of forming the body of claim 1 comprising:
(a) admixing the particulate reactants, and
(b) shaping and heating the admixture to form the reaction sintered body, the heating being done in atmosphere that is nonreactive with the admixed reactants and at temperature at which the reaction and sintering occurs between the reactants to substantially form the nitride and second phases.

* * * * *